United States Patent

Howland et al.

[15] 3,663,734
[45] May 16, 1972

[54] SIMULATED AIRCRAFT RADIO AIDS

[72] Inventors: Robert W. Howland, Windsor; Richard L. Van Fleet, Binghamton, both of N.Y.

[73] Assignee: The Singer Company, New York, N.Y.

[22] Filed: Mar. 27, 1970

[21] Appl. No.: 23,314

[52] U.S. Cl. .................. 35/10.2, 235/150.27, 340/347 DA
[51] Int. Cl. ........................................ G09b 9/08, G06g 7/78
[58] Field of Search ................... 35/10.2, 12 F, 12 P, 12 Q, 35/10.4; 235/150.5, 168, 177, 150.26, 150.27; 244/77 R, 77 B, 77 C; 340/347 DA; 343/10, 16 R, 107, 225, 113

[56] References Cited

UNITED STATES PATENTS

| | | | |
|---|---|---|---|
| 3,504,165 | 3/1970 | Richardson et al. | 235/150.27 X |
| 3,483,362 | 12/1969 | Feldmann et al. | 235/150.5 |
| 3,508,253 | 4/1970 | James | 340/347 |
| 3,534,399 | 10/1970 | Hirsch | 343/107 X |
| 2,846,780 | 8/1958 | Gallo | 35/10.2 |
| 2,947,088 | 8/1960 | Zahner et al. | 35/10.2 |
| 3,347,457 | 10/1967 | Kamm | 340/347 X |
| 3,351,746 | 11/1967 | Gotz et al. | 340/347 X |
| 3,500,439 | 3/1970 | Minnich et al. | 35/10.2 |
| 3,517,108 | 6/1960 | McCarthy | 35/10.2 |

Primary Examiner—Malcolm A. Morrison
Assistant Examiner—Jerry Smith
Attorney—Francis L. Masselle, William Grobman and Charles S. McGuire

[57] ABSTRACT

A system for deriving electrical signals to operate simulated radio and navigation equipment in a fixed-base aircraft trainer in accordance with assumed fixed data and variable flight information. Data associated with the transmitting stations is programmed on punched cards which are inserted in a static card reader and supplied in digital form to other components for operations combining or comparing such data with digital flight data. Signals representing the difference between station and aircraft reference coordinates are provided in digital form, as opposed to the analog signals in all prior forms of such apparatus. These digital signals are then applied to a D/A converter, along with other digital signals representing other navigational information, and commensurate analog voltages are produced and sampled at appropriate times to provide signals for computation in the aircraft trainer radio aids analog computer. The D/A converter is time-shared so that it provides, in addition to the aforementioned analog outputs, a ramp voltage generated in response to an input from a free running digital counter.

4 Claims, 3 Drawing Figures

Robert W. Howland
and
Richard L. Van Fleet
INVENTORS

BY Charles L. McGuire

ATTORNEY

SIMULATED AIRCRAFT RADIO AIDS

This invention relates to the simulation of an aircraft radio navigational aids system for use in fixed-base flight trainers and simulators.

Training of pilots in grounded aircraft simulators has become increasingly important as the number and complexity of aircraft has increased. In order to provide optimum training value it is necessary to duplicate in the simulator the appearance and operation of not only the primary flight control members and instruments, but also related aircraft systems with which the pilot must be familiar. One of the most important of such systems is the aircraft radio navigational aids system by means of which transmitting stations at preselected, fixed locations generate signals which are received by compatible equipment in the aircraft and translated into output data which the pilot may use to navigate the plane.

Since the simulator does not move with respect to fixed transmitting stations it is necessary to provide means which electronically compute the assumed position of the aircraft during a simulated flight and compare this with the assumed fixed position of a transmitter. According to the present invention means are provided for generating signals in digital form commensurate with assumed reference coordinates of a simulated station transmitting at a frequency to which the tuning controls of a simulated receiver have been set by the student operator. Similar digital signals representing the assumed position of the aircraft, as computed in the conventional flight trainer computer, are generated and the difference between present assumed aircraft and station positions is calculated by subtracting the digital signals representing the reference coordinates of each in a binary subtractor. The data is then converted to analog form and supplied to conventional analog computing means to derive signals for driving simulated navigational instruments which are analog in nature.

Data associated with the assumed transmitting station other than location and frequency, e.g., call letters, magnetic variation, field elevation, etc. is also provided in digital form by being programmed on punched cards and shifted out of a conventional static card reader as required. Inputs which are essentially analog in nature, such as the setting of certain radio tuning dials, are converted to digital form by comparing a voltage commensurate with the analog input with a ramp voltage which is produced by conversion from a cyclic digital count from a free-running counter. The digital-to-analog converter which produces the ramp voltage is time-shared so that it can also be used to convert the aforementioned digital signals from the card reader and subtractor to analog form.

It is a principal object of the present invention to provide a simulated radio navigational aids system which facilitates the handling of data in digital form.

A further object is to provide a simulated radio navigational aids system wherein a single D/A converter is time-shared to provide a plurality of analog outputs for different uses.

Another object is to provide a system for use in a fixed-base flight trainer wherein data associated with an assumed transmitting station is represented digitally and combined with variable data, also in digital form, associated with a simulated flight of the trainer to derive signals for driving simulated navigational instruments in a novel and improved manner.

Other objects of the invention will in part be obvious and will in part appear hereinafter.

The invention accordingly comprises the features of construction, combination of elements, and arrangement of parts, which will be exemplified in the construction hereinafter set forth, and the scope of the invention will be indicated in the claims.

For a fuller understanding of the nature and objects of the invention reference should be had to the following detailed description taken in connection with the accompanying drawings in which.

Figure 1:
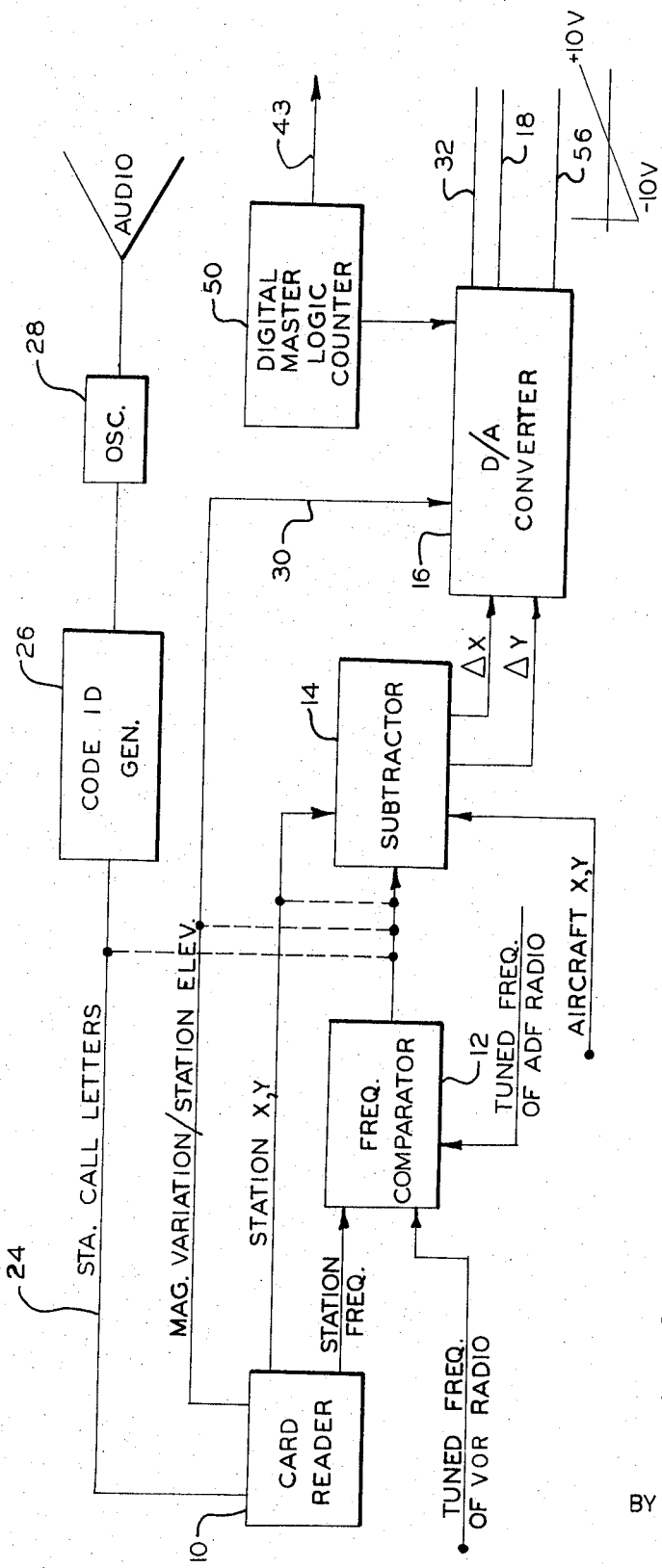
FIG. 1 is a functional block diagram of the elements providing digital signal generation and operations for simulation of radio aids and instrument drives.

One of the most common aircraft radio navigation aids is the Visual Omnirange system which includes fixed transmitters located at selected points throughout the country to generate signals for reception by aircraft radio receivers. A VOR converter drives the meter movement of an instrument which indicates to the pilot the present heading from the aircraft to or from the station transmitting the signals. In a fixed-base aircraft trainer, of course, there are no radio receivers in the proper sense, but means are provided for generating electrical signals to drive a VOR instrument in accordance with the simulated position of the aircraft and an assumed position of a VOR transmitter. The same applies with respect to other simulated navigational instruments such as glide slope, marker beacon, radio magnetic indicator (RMI), automatic direction finder (ADF), etc.

According to the present invention, station information with respect to the assumed VOR transmitters, e.g., call letters, magnetic variation, location in terms of X and Y reference coordinates, and frequency, is programmed on punched cards in accordance with well-known techniques. Similar information with respect to instrument landing system (ILS) transmitters, e.g., field elevation, distance to runway, etc., is also programmed on the cards, one line for each station simulated. By means of a student selector switch the system may be operated in either VOR or ILS mode. Suitable examples of commercially available components represented in the block diagrams are given, where appropriate, to avoid unnecessary length of the specification. Cards are inserted in static card reader 10, (e.g., Model 2980A manufactured by AMP, Inc. of Harrisburg, Pa.) where the programmed data is read and held in the reader until needed. The data is preferably shifted serially out of the card reader, thus allowing the use of common elements of electronic equipment for performing various functions to be described. The reader is interrogated to compare the programmed information variable data from the flight computer or student inputs.

The programmed VOR station frequency is compared with the digitally represented frequency to which the simulated aircraft VOR receiver has been set by frequency comparator 12 (e.g., National Semiconductor Corp., Santa Clara, Calif., DM8200 Comparator). The station reference coordinates X and Y are supplied to binary subtractor 14, constructed according to known techniques from standard logic components, as are the present coordinates representing the simulated position of the aircraft as computed in the standard flight computer in accordance with a preset initial (takeoff) aircraft position and flight variables such as airspeed, heading, wind drift, etc. Subtractor 14 provides digital signals, representing the difference ($\Delta X$, $\Delta Y$) between the station and aircraft coordinates, to D/A converter 16 (e.g., Model EDAC–10 of Data Device Corp., Hicksville, N.Y.) which converts the signals to analog DC voltage outputs on line 18.

Figure 3:
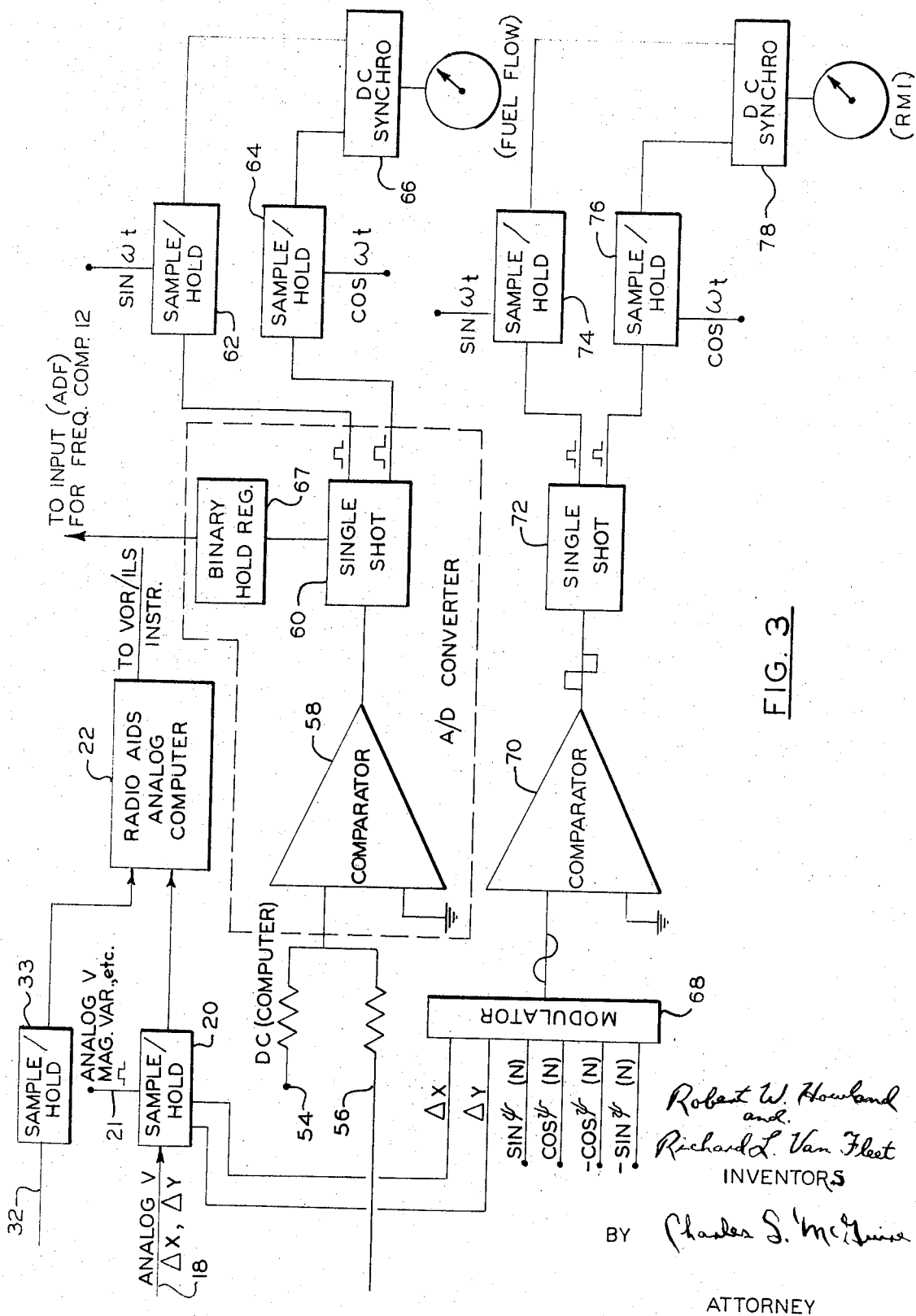
FIG. 3 is an additional functional block diagram of elements for digitally integrating signals representing variable flight quantities and providing DC outputs for driving flight instruments.

Turning briefly to FIG. 3 sample/hold circuit 20 is shown receiving the $\Delta X$, $\Delta Y$ analog inputs from line 18 and sample pulses through line 21 from frequency comparator 12 when the output of the latter indicates that the aircraft radio is properly tuned to the station frequency. When a sampling pulse is received, the instantaneous value of the analog voltage commensurate with $\Delta X$ and $\Delta Y$ is sampled and applied to radio aids analog computer 22, conventional in many aircraft trainers in present commercial use, for computation of signals to drive an appropriate simulated VOR instrument.

Returning to FIG. 1, another value from card reader 10 indicating the station call letters is fed through line 24 to code ID generator, a suitable example of which, insofar as the internal code generation is concerned, is disclosed in U. S. application Ser. No. 633,296, now U. S. Pat. No. 3,496,563; appropriate modification is provided to allow the present code generator to accept the binary input from the reader. Generator 26 supplies serial binary signals which are fed directly to oscillator 28 to provide an audio output of the call letters in Morse code. Signals from reader 10 indicating magnetic variation and station elevation (when operating in VOR mode), or runway bearing and field elevation (when operating in ILS mode), are fed through line 30 to D/A converter 16. The latter is multiplexed to provide, in addition to the previously mentioned output on line 18 and other described later, an analog voltage through line 32 commensurate with the digital input through line 30. This analog value is sampled by sample/hold circuit 33 (FIG. 3) and applied to computer 22 in the same manner as the analog value on line 18 representing ΔX and ΔY. All of the values representing station data are controlled by frequency comparator 12 since the data is valid only when the simulated radio is set by the student to the proper frequency.

Signals representing the rate of change of certain flight variables, as determined by the flight computer, must be integrated to provide values of the quantities which may be used to drive certain flight instruments, and for other purposes. For example, the flight computer may generate signals representing the rate of change of heading which must be integrated to provide signals for driving the simulated gyro compass instrument; pitch and roll rate of change provide signals for the aircraft attitude instruments, as well as providing position signals for the trainer motion system; aircraft X and Y rate of change may be integrated to provide signals to a recorder which plots the simulated path followed by the aircraft. In the system of the present invention, signals representing heading, pitch, roll, X and Y are derived by digital integration, thereby eliminating cumulative errors (drift) inherent in analog systems.

Figure 2:
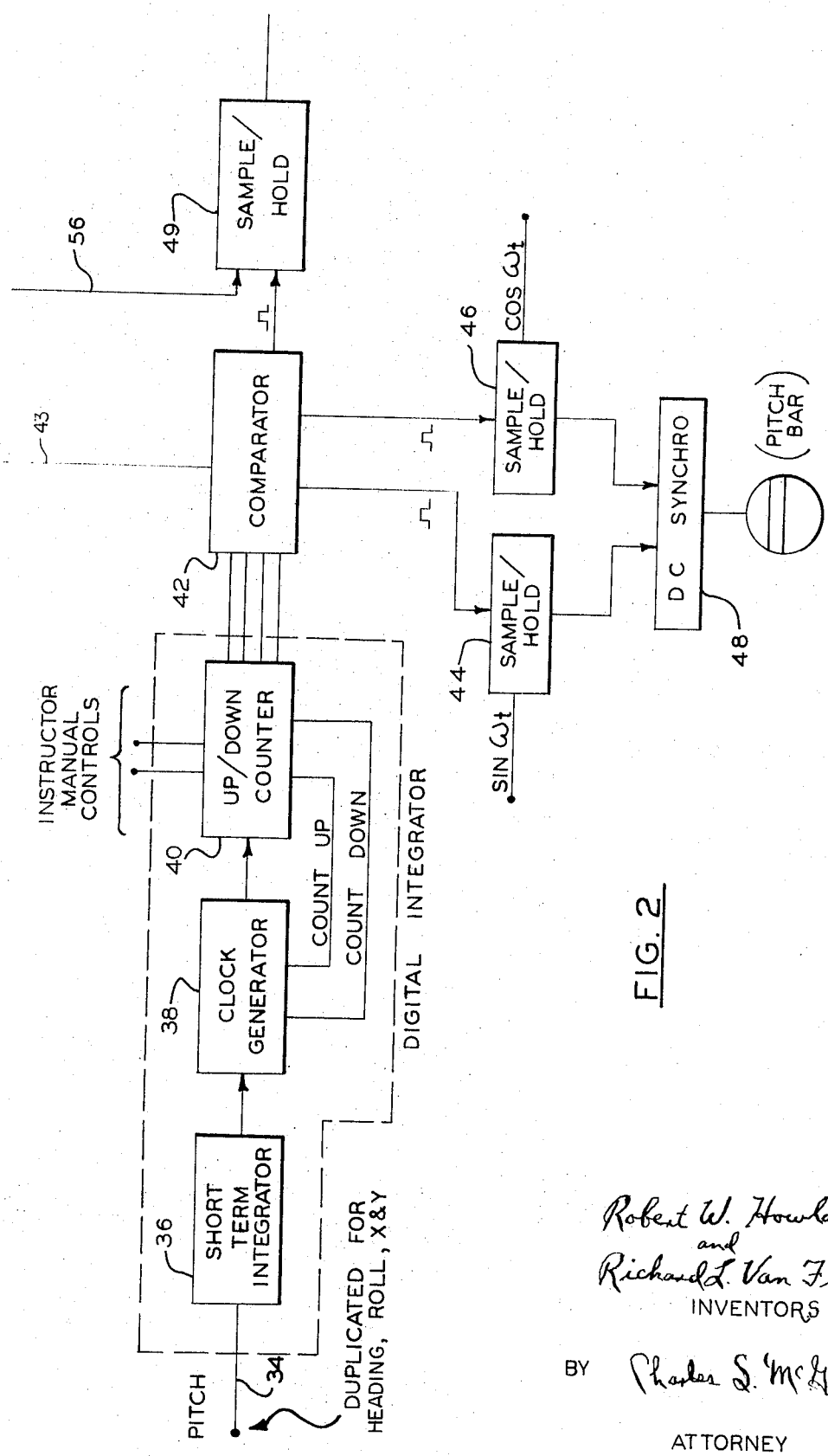
FIG. 2 is a functional block diagram of other elements which receive analog inputs converted from the digital signals of FIG. 1, and provide outputs for the simulated navigational and flight instruments.

FIG. 2 shows a block diagram form the elements for deriving signals to drive the simulated pitch bar or artificial horizon instrument and a DC signal commensurate with pitch attitude. The elements of FIG. 2 would be duplicated for each of the other flight variables to be integrated. The signal from the flight computer representing rate of change of pitch is provided through line 34 to short term integrator 36 (e.g., National Semiconductor LM201 Operational Amplifier). This integrated value is applied to clock generator 38 (e.g., Fairchild Semi-conductor, Mountain View, Calif., Model 9601 Single Shot Multivibrator) to control the frequency of pulses applied to up-down counter 40 (e.g., National Semiconductor DM 8563 16-pin flat pack). The initial condition of the counter may be controlled by the manual setting of potentiometers having analog outputs representing the initial aircraft reference position (X, Y) which are applied to an A/D converter (not shown) and then applied digitally to counter 40. The rate of the counter is determined by the frequency of pulses from clock generator 38 and the direction of the count, up or down, is dependent on the polarity of the input from the computer. The counter value is compared by digital comparator 42 (e.g., National Semiconductor DM 8200 Comparator) with an input from a free-running digital master logic counter supplied through line 43. When the two values match, an output pulse is generated by the comparator and applied as a sample pulse to sample/hold circuits 44 and 46. The amplitude of a 400 Hz sine wave, referenced to he master logic of the trainer and applied continuously from the computer to circuit 44, is sampled at the time a pulse is received from the comparator 42; this will cause the amplitude to be sampled at the phase angle of the sine wave corresponding to the pitch angle. A DC signal commensurate with the amplitude of the sine wave at that time is applied to one winding of DC synchro 48. Likewise, the amplitude of a reference cosine wave is sampled at the proper phase angle by circuit 46 in response to a pulse from comparator 42 and applied as a DC input to the other winding of synchro 48. Thus, the simulated pitch bar driven by the DC synchro will be positioned in accordance with simulated aircraft pitch attitude. The function and operation of sample/hold 49 will be explained later.

The output of free-running, digital counter 50, controlled by the flight computer master logic, is applied to D/A converter 16 which is time shared so that, in addition to the analog DC voltages previously described, the output of counter 50 is converted to a ramp voltage, e.g., from −10 to +10 volts at a rate of 400 cycles per second. The ramp voltage may be compared with another analog quantity, and when the two match, a sample pulse generated to provide signals to drive instruments where no integration of the flight quantity input is required. Such instruments include, for example, rate of climb, rpm, fuel pressure, fuel flow and manifold air pressure. A DC signal from the flight computer commensurate with the computed value of the appropriate flight quantity is applied at terminal 54. When this value is equal to the value of the ramp voltage applied to line 56 the polarity of amplifier 58, which thus serves as a comparator of the voltages on lines 54 and 56, is changed. This fires single shot multivibrator 60 to provide sampling pulses to sample/hold circuits 62 and 64. The amplitudes of sine and cosine waves applied by the computer to circuits 62 and 64, respectively, are thus sampled and applied as DC signals to the windings of synchro 66. The latter comprises a DC synchro repeater having two orthogonal stator windings and permanent magnet rotor. By energizing the two windings with DC voltages proportional to the sine and cosine of an angle/wt the rotor will orient itself with the resultant field at an angle relative to an initial reference position which indicates the simulated value of the flight quantity.

Another input which may be applied at a terminal such as 54 for comparison with the ramp voltage on line 56 is an analog voltage commensurate with the position at which the tuning dial of the simulated ADF radio is set by the student operator of the flight trainer. Although VOR receivers are tuned to discrete frequencies and thus may be digitally represented, ADF tuning is analog in nature and must be converted to digital form before being used in the system of FIG. 1. When multivibrator 60 fires in response to change of polarity of amplifier 58, the binary number necessary to produce the analog value of the ramp voltage at that time is entered in binary hold register 67. This value is supplied to frequency comparator 12 for comparison with the ADF frequency programmed on the punched card in reader 10. In this instance, comparator 58, multivibrator 60 and hold register 67 form an A/D converter, indicated by dotted lines in FIG. 3, for converting the data into digital form. Of course, a separate comparator and multivibrator would be provided for each analog input at terminals such as 54, but for ease of illustration only one set of elements is shown for both inputs discussed above.

The value of the ramp voltage is sampled by circuit 49 when a sampling pulse is generated by comparator 42. The sample pulse is generated, as previously mentioned, when a digital value representing some flight quantity matches a corresponding input from the master logic. In the FIG. 2 example, a pulse from comparator 42 is generated in response to a pulse count from counter 40 representing aircraft pitch matching a corresponding value from the master logic counter 50. A sampling of the ramp voltage at that time indicates the binary value required to produce the sampled ramp voltage. Thus, a DC voltage output from sample/hold circuit 49 indicating aircraft pitch may be used as an input to the motion system which physically orients the trainer cockpit with the pitch angle of the simulated aircraft. Likewise, sampling of ramp voltages to produce DC outputs indicating aircraft X and Y may be used to drive a recorder.

Quantities representing ΔX and ΔY, supplied on line 18 as previously described, and the sine and cosine and negative sine and cosine of heading angle, are applied to modulator 68. The variable sine and cosine values are represented as notched square waves, as explained in Minnich et al. U.s. application Ser. No. 725,706, wherein the operation of modulators such as 68 is also discussed. The output of modulator 68 is a sine wave which is changed to a square wave at the same phase by analog comparator 70. When the phase of the wave crosses zero single shot multivibrator 72 is fired to produce a sampling pulse to circuits 74 and 76. The phase of the sine wave output of modulator 68 is commensurate with the difference between ΔX/ΔY and heading angle. Thus, the sampling of sine ωt and cosine wt in accordance with the phase of this output indicates the difference between the bearing from the aircraft to the station and the heading of the aircraft. This is the information displayed by the needles of an RMI instrument driven by DC synchro 78.

We claim:

1. A system for simulating aircraft radio navigation equipment in a fixed-base aircraft trainer wherein the simulated aircraft parameters are computed by an analog computer, said system comprising, in combination:
   a. first means for representing digitally the simulated location, in terms of assumed reference coordinates, and the frequency of a transmitting station;
   b. second means for representing digitally the simulated location, in terms of said reference coordinates, of said trainer;
   c. third means responsive to the setting of a simulated tuning dial for representing digitally the frequency to which said tuning dial has been set.
   d. a binary subtractor adapted to receive digital inputs from said first and second means and generate a digital output representing the difference between the simulated location of said station and said aircraft;
   e. a digital-to-analog converter for converting said digital output to analog voltages commensurate with said difference in location;
   f. means for comparing said digital representation of said transmitting station simulated frequency with said digital representation of said tuning dial setting; and
   g. means responsive to said comparing means for validating the output of said binary subtractor only when said frequencies are the same.

2. The invention according to claim 1 wherein said first means comprises a static card reader having an output commensurate with data programmed on punched cards inserted in said reader.

3. The invention according to claim 1 wherein signals commensurate with the frequency to which the simulated VOR tuning dial has been set are directly represented digitally, and an analog signal commensurate with the frequency to which the simulated ADF tuning dial has been set is converted to digital form by analog-to-digital converting means.

4. The invention according to claim 3 wherein the value of said analog signal is compared with a ramp voltage generated by said digital-to-analog converter in response to an input from a digital master logic counter, and the digital value necessary to produce the ramp voltage value which is equal to said analog signal is compared with the digital value of the simulated ADF frequency programmed on said punched cards.

* * * * *